(12) United States Patent
Bryant (10) Patent No.: US 12,003,185 B2
(45) Date of Patent: Jun. 4, 2024

(54) MODULAR SWITCHING CELL (71) Applicant: Maschinenfabrik Reinhausen GmbH, Regensburg (DE)

(72) Inventor: Angus Bryant, Cambridge (GB)

(73) Assignee: MASCHINENFABRIK REINHAUSEN GMBH, Regensburg (DE)

(*) Notice: Subject to any disclaimer, the term of this patent is extended or adjusted under 35 U.S.C. 154(b) by 0 days.

(21) Appl. No.: 17/641,824

(22) PCT Filed: Aug. 27, 2020

(86) PCT No.: PCT/EP2020/073922
§ 371 (c)(1),
(2) Date: Mar. 10, 2022

(87) PCT Pub. No.: WO2021/052730
PCT Pub. Date: Mar. 25, 2021

(65) Prior Publication Data
US 2024/0048063 A1 Feb. 8, 2024

(30) Foreign Application Priority Data
Sep. 17, 2019 (EP) .................... 19197834

(51) Int. Cl.
H02M 7/00 (2006.01)
H01G 2/04 (2006.01)
(Continued)

(52) U.S. Cl.
CPC .............. *H02M 7/003* (2013.01); *H01G 2/04* (2013.01); *H01G 9/26* (2013.01); *H02M 7/4835* (2021.05)

(58) Field of Classification Search
CPC .................... H02M 7/003; H02M 7/4835
See application file for complete search history.

(56) References Cited

U.S. PATENT DOCUMENTS

2006/0039127 A1* 2/2006 West ............... H05K 1/144
257/691
2007/0177358 A1* 8/2007 Schilling ............ H02M 7/003
361/730
(Continued)

FOREIGN PATENT DOCUMENTS

CN 202616988 U 12/2012
CN 103441691 A 12/2013
(Continued)

*Primary Examiner* — Sherman Ng
(74) *Attorney, Agent, or Firm* — LEYDIG, VOIT & MAYER, LTD.

(57) ABSTRACT

A modular switching cell of a high voltage direct current power converter has a modular switching cell that includes a base module, which has: a first switching unit; a second switching unit; a first capacitor; and a second capacitor. The first switching unit, the second switching unit, the first capacitor, and the second capacitor are mounted on a chassis. The base module is configured to receive at least three different busbar sets, each of the busbar sets having a plurality of busbars for interconnecting the first switching unit, the second switching unit, the first capacitor, and the second capacitor to form one of: two parallel half bridge circuits between a first cell terminal and a second cell terminal; two serial half bridge circuits between the first cell terminal and the second cell terminal; or a full bridge circuit between the first cell terminal and the second cell terminal.

14 Claims, 8 Drawing Sheets (51) Int. Cl.
    *H01G 9/26*       (2006.01)
    *H02M 7/483*    (2007.01)

(56) References Cited

U.S. PATENT DOCUMENTS

| | | | |
|---|---|---|---|
| 2019/0052187 A1* | 2/2019 | Geske | H02M 1/32 |
| 2019/0165693 A1* | 5/2019 | Malipaard | H02M 7/4835 |
| 2020/0177097 A1 | 6/2020 | Takahashi et al. | |

FOREIGN PATENT DOCUMENTS

| | | |
|---|---|---|
| CN | 207339661 U | 5/2018 |
| CN | 109995258 A | 7/2019 |
| JP | 6345379 B1 | 6/2018 |
| WO | WO 2018028778 A1 | 2/2018 |
| WO | WO 2019120468 A1 | 6/2019 |

\* cited by examiner

MODULAR SWITCHING CELL

CROSS REFERENCE TO RELATED APPLICATIONS

This application is a U.S. National Phase application under 35 U.S.C. § 371 of International Application No. PCT/EP2020/073922, filed on Aug. 27, 2020, and claims benefit to European Patent Application No. EP 19197834.5, filed on Sep. 17, 2019. The International Application was published in English on Mar. 25, 2021 as WO 2021/052730 A1 under PCT Article 21(2).

FIELD

The invention relates to a modular switching cell.

BACKGROUND

A Multi-level Modular Converter (MMC) design is the standard approach within the power converter industry to realise High Voltage Direct Current (HVDC) converters for use in power transmission. They are being widely adopted, too, for use in medium-voltage (MV) drive applications, including power distribution applications such as in a static synchronous compensator (STATCOM).

An MMC converter consists of multiple cells connected in series to form a phase arm; one or two of these may be used per phase, depending on the application. Traditional MMC cells are half-bridge or full-bridge. Half-bridge cells block voltage in one direction, while full-bridge cells block voltage in both directions. The MMC cells usually include insulated gate bipolar transistors (IGBTs).

In a family of production converters, there may be a range of overall converter current and voltage ratings, to suit a wide range of applications. Accommodating different voltage ratings is straightforward given that many cells are placed in series to achieve the required voltage rating; however, the current rating of the converter typically falls within the current rating of a single cell. Therefore to produce a range of converter current ratings either requires a range of different cell designs, each with a different current rating, or underutilization of the cell current rating for low-current converter designs resulting in a high cost per kW.

Traditional MMC cell designs are available in the public domain. Many are described in the following publications:

K. Sharifabadi, L. Harnefors, H-P. Nee, S. Norrga and R. Teodorescu, "Design, Control and Application of Modular Multilevel Converters for HVDC Transmission Systems," John Wiley & Sons/IEE Press, 2016

M. Merlin, "HVDC activity at Imperial College" 2015, slides 16-18,

Alstom Grid/GE Grid references: C. Barker, HVDC Plenary Session, IEEE EPEC 2011

C. Bartzsch, H. Huang, T. Westerweller and M. Davies, "HVDC PLUS and SVC PLUS: Reliable and Cost-effective Power Transmission Solutions with Modular Multilevel Converters," 2011.

SUMMARY

In an embodiment, the present disclosure provides a modular switching cell of a high voltage direct current power converter, which includes a base module that has: a first switching unit; a second switching unit; a first capacitor; and a second capacitor. The first switching unit, the second switching unit, the first capacitor, and the second capacitor are mounted on a chassis. The base module is configured to receive at least three different busbar sets, each of the busbar sets having a plurality of busbars for interconnecting the first switching unit, the second switching unit, the first capacitor, and the second capacitor to form one of: two parallel half bridge circuits between a first cell terminal and a second cell terminal; two serial half bridge circuits between the first cell terminal and the second cell terminal; or a full bridge circuit between the first cell terminal and the second cell terminal.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

A problem with the above-discussed state of the art is that the cell design is highly optimized for a particular topology and current rating. The optimization for a particular current rating affects, for example, the choice of IGBT/diode module, cell capacitor and bypass switch. The current rating is often given as share of a predetermined current value. For example, a fully-rated cell can carry the whole predetermined current. A half-rated cell can only carry half of the predetermined current. While a half-rated cell may theoretically result in half the size, the constituent component availability may preclude this, e.g. if the IGBT module is only available to suit the full cell rating. Even where half-rated cell components are available, each half-rated cell will still require the same quantity of control components, i.e. cell controller, current/voltage sensors, cell power supply, etc., as the fully-rated cell and a similar cost and volume of mechanical components. The rack-support structure for multiple cells will also be different, because of the different size. Therefore a half-rated cell will result in significantly more than half the cost and volume of the fully-rated cell, and hence the resulting MMC converter will be more expensive (€/kW) and less power dense (kW/m$^3$). Furthermore, the half-rated cell will require a separate design, with associated engineering costs.

This lack of flexibility is also apparent if a full-bridge cell is required. Unless half-rated cell components are available, then a half-rated full-bridge cell will similarly require a separate design, with associated engineering costs.

Therefore, a problem solved is finding a switching cell that is cheap, has a high power density and can be used for different topologies and current ratings. Aspects of the present disclosure solve this problem.

The present disclosure relates to a modular switching cell. The switching cell may include a base module, which can be configured by connecting terminals of the base module via pre-shaped busbars in different ways in order to realize different cell module types. The present disclosure further relates to a system including the modular switching cell and respective busbars. Finally, the present disclosure relates to a method for manufacturing a modular switching cell.

Particularly, the present disclosure describes a common cell design, which uses the same basic mechanical design for either a fully-rated cell or two series half-rated cells, with the latter resulting in the same cost per unit power rating and power density as the fully-rated cell. These could share a mainly common design, simplifying the design effort and resulting in a lower cost system.

The present disclosure provides a modular switching cell of a high voltage direct current power converter, which comprises a base module. The base module has a first switching unit, a second switching unit, a first capacitor, and a second capacitor. These elements, i.e. the first switching unit, the second switching unit, the first capacitor, and the second capacitor are all mounted on a chassis. In this way, the base module allows for different interconnection of the elements in order to arrive at different designs. The first switching unit and the second switching unit preferably include IGBTs.

The base module is adapted to receive at least three different busbar sets, each including a plurality of busbars for interconnecting the first switching unit, the second switching unit, the first capacitor, and the second capacitor. Each of the busbar sets allows a different design of the base module. In particular, one of the busbar sets allows forming two parallel half bridge circuits between a first cell terminal and a second cell terminal. In addition, another one of the busbar sets allows forming two serial half bridge circuits between the first cell terminal and the second cell terminal. Yet another one of the busbar sets allows forming a full bridge circuit between the first cell terminal and the second cell terminal. Therefore, each busbar set interconnects the above described elements of the base module in a different manner. Hence, the base module can be used for different cell types, particularly for different current ratings and topologies. Therefore, the modular switching cell is cheap and allows high power densities.

Embodiments of the invention provide a common cell design, which uses the same basic mechanical design, i.e. the base module, for either a fully-rated cell or two series of half-rated cells, with the latter resulting in the same cost per unit power rating and power density as the fully rated cell. These cell types share a manly common design and thereby simplifying the design effort and resulting in a lower cost system.

In a preferred embodiment, the first switching unit has a first AC voltage terminal, a first negative DC terminal, a first positive DC terminal, a first switch between the first AC voltage terminal and the first negative DC terminal, and a second switch between the first AC voltage terminal and the first positive DC terminal. In this way, the first switching unit is particularly formed as half bridge module. Further, the second switching unit, in a preferred embodiment, has a second AC voltage terminal, a second negative DC terminal, a second positive DC terminal, a third switch between the second AC voltage terminal and the second negative DC terminal, and a fourth switch between the second AC voltage terminal and the second positive DC terminal. Again, the second switching unit is particularly formed as half bridge module. The base module is adapted to receive each busbar set such that the busbars of the respective busbar set interconnect all the terminals of the first switching unit and the second switching unit and the first capacitor and the second capacitor. In this way, particularly the first AC voltage terminal, the first negative DC terminal, the first positive DC terminal, the second AC voltage terminal, the second negative DC terminal, the second positive DC terminal, the first capacitor, and the second capacitor are interconnected. The busbars are provided such that they form one of the two parallel half bridge circuits, the two serial half bridge circuits, and the full bridge circuit. Therefore, only the busbars have to be different in case a different circuit has to be provided. Therefore, one basis module can be used for implementing a wide variety of power converters.

In a preferred embodiment, at least the first negative DC terminal is electrically connected to the chassis. The chassis preferably functions as chassis ground. Depending on the cell design defined by the busbar sets, the second positive DC terminal or the second negative DC terminal are preferably also connected to the chassis. It is preferable that all switching units share the same chassis ground, such that particularly only a single chassis ground potential exists in the modular switching cell.

In a preferred embodiment, the first switch and the second switch of the first switching unit and the third switch and the fourth switch of the second switching unit all include an electronic switch. The electronic switch particularly comprises an insulated-gate bipolar transistor (IGBT), and a diode which are wired in parallel to each other. Instead of IGBTs, also other electronic switches like integrated gate-commutated thyristors (IGCT), gate turn-off thyristors (GTO-Thyristors), metal oxide semiconductor field-effect transistors (MOSFETs), high-electron-mobility transistors (HEMT) or bipolar junction transistors (BJT) can be used. All these elements can be combined in different manners, i.e. via different busbar sets, in order to realize different modular switching cells and thus power converters.

The modular switching cell, in a preferred embodiment, includes a single control unit. The control unit is adapted to switch the first switch and the second switch of the first switching unit and the third switch and the fourth switch of the second switching unit. In this way, the power input to the modular switching cell can undergo optimal power conversion. The converted power is output. Thereby, the whole control of all the switches is preferably controlled by the single control unit.

In preferred embodiment, the first switching unit includes a first sub-switching unit and a second sub-switching unit. In this case, the first switching unit and the second switching unit are not half bridge modules (e.g. half-bridge IGBTs) but rather are single switch modules (e.g. IGBTs). The first sub-switching unit preferably includes the first AC voltage terminal, the first negative DC terminal, and the first switch. The second sub-switching unit preferably includes the first AC voltage terminal, the first positive DC terminal, and the second switch. Thus, the interconnection of the first switching element is still possible via the busbar sets, wherein the two sub-switching units have to be connected separately. In the same way, the second switching unit preferably includes a third sub-switching unit and a fourth sub-switching unit. The third sub-switching unit has the second AC voltage terminal, the second negative DC terminal, and the third switch. The fourth sub-switching unit on the other side has the second AC voltage terminal, the second positive DC terminal, and, the fourth switch. Thus, the second switching unit also includes two sub-switching units, which are to be connected separately via the busbars.

It is further preferred that a heat sink is provided. The heat sink is particularly provided to dissipated heat of more than one switching unit. Preferably, the first switching unit, the second switching unit, the first capacitor, and the second capacitor are provided with a common heat sink. Therefore, the power density of the cell is improved and the costs for providing the cell is reduced.

The modular switching cell, in an embodiment, has a bypass switch provided between the first cell terminal and the second cell terminal. The bypass switch is adapted to bypass the switching cell, by shortcutting the first cell terminal and the second cell terminal. In case a converter is set up of the modular switching cells as described above, the bypass switch allows to not use the respective switching cell, e.g. in case of damage of the switching cell. Thus, failure of one switching cell does not necessarily lead to a failure of the whole converter. In an alternative embodiment, the bypass switch is omitted and the components of the switching cell are adapted to shortcut the first cell terminal and the second cell terminal in case of component failure.

In another advantageous embodiment, the first switching unit, the second switching unit, the first capacitor, and the second capacitor are electrically connectable via the busbar sets all from the same side. Thus, the busbar set only has to be arranged on one side of the base module to interconnect all the components. Therefore, different cell designs, particularly the cell designs as described above, can be provided in a simplified manner.

An embodiment of the present invention provides a system, including the modular switching cell—as described above—and at least two of a first busbar set, and a second busbar set, and a third busbar set. Therefore, the system can be configured to provide different cell designs. A converter can preferably be set up from several of these systems. In the system, the first capacitor is provided between a first capacitor terminal and a second capacitor terminal and the second capacitor is provided between a third capacitor terminal and a fourth capacitor terminal. All these capacitor terminal can be connected via the busbars of the busbar set to connect the switching units and the capacitors. With the different busbar sets, different designs can be provided, wherein these different busbar sets are now described:

The first busbar set includes a first busbar, a second busbar, and a third busbar. The first busbar electrically connects the first negative DC terminal and the second negative DC terminal and the second capacitor terminal and the fourth capacitor terminal. The second busbar electrically connects the first positive DC terminal and the second positive DC terminal and the first capacitor terminal and the third capacitor terminal. Finally, the first AC voltage terminal and the second AC voltage terminal are electrically connected via the third busbar. In this cell design, the first busbar is the second cell terminal and the third busbar is the first cell terminal. Therefore, the first busbar set preferably defines a fully rated half-bridge cell. This means that the switching units are half-rated and are connected in parallel via the first busbar set. Hence, the cell design is a half-bridge, while each switching unit particularly carries half the current flowing through each cell.

In an additional or alternative embodiment, the second busbar set includes a fourth busbar, a fifth busbar, a sixth busbar, a seventh busbar, and an eighth busbar. The fourth busbar is electrically connected to the first AC voltage terminal. The fifth busbar electrically connects the first positive DC terminal and the first capacitor terminal. The second negative DC terminal and the fourth capacitor terminal are electrically connected via the sixth busbar. The seventh busbar electrically connects the first negative DC terminal and the second positive DC terminal and the second capacitor terminal and the third capacitor terminal. Finally, the eighth busbar is electrically connected to the second AC voltage terminal. According to this cell design, the fourth busbar is the first cell terminal and the eighth busbar is the second cell terminal. In this cell design, a half-rated dual cell is provided. This means that the two switching units are connected in series such that the cell fulfils the function of two half-rated cells.

In another additional or alternative embodiment, the third busbar set includes the second busbar as described before, the fourth busbar as described before, the eighth busbar as described before, and a ninth busbar. The ninth busbar electrically connects the first negative DC terminal and the second negative DC terminal and the second capacitor terminal and the fourth capacitor terminal. This cell design realizes a half-rated full-bridge. Therefore, the switching units are coupled such that they form a full-bridge. Particularly, as described above, each of the switching unit is a half bridge modules, such that these half bridge modules are combined by the third busbar set to form a full-bridge.

Hence, from the same base module, i.e. from the same switching units and capacitors, at least three different cell designs can be produced only by combining the base module with one of the first busbar set and second busbar set and third busbar set. This allows an increased flexibility in providing different cell types and/or converters.

The busbars of each busbar set advantageously are laminated busbars. By providing laminated busbars, the required space for interconnecting the switching units and capacitors is reduced. In addition, the electrical properties are enhanced, e.g. the stray inductance is reduced.

Each busbar set includes busbars that define the first cell terminal and the second cell terminal arranged for electrically connecting the switching cell with other components, particularly with other switching cells of the power converter. Therefore, in order to set up a converter, each cell is connected via the respective busbars forming the cell terminals.

An embodiment of the present invention provides a high voltage direct current power converter. The converter includes a three phase voltage input and, for each phase of the three phase voltage input, a plurality of switching cells as described above. The switching cells are connected in series. Therefore, the power converter can be provided with flexible and inexpensive switching cells as described above, wherein the switching cells particularly have a high energy density.

An embodiment of the present invention provides a method of manufacturing a modular switching cell. The method comprises the following steps: On the one side, a base module is provided by mounting a first switching unit, a second switching unit, a first capacitor, and a second capacitor on a chassis. This base module is adapted to receive different busbar sets in order to realize different cell designs. Hence, at least two different busbar sets are provided. Each set includes a plurality of busbars for interconnecting the first switching unit, the second switching unit, the first capacitor, and the second capacitor. The busbars of each busbar set are adapted to form one of two parallel half bridge circuits between a first cell terminal and a second cell terminal, and two serial half bridge circuits between the first cell terminal and the second cell terminal, and a full bridge circuit between the first cell terminal and the second cell terminal. Thus, each busbar set allows another cell design by interconnecting the elements of the base module in different manners. As a last step, one of the busbar sets is mounted on the base element. By mounting the respective busbar set on the base element, a switching cell is provided which has one of the designs listed above. Since any one of the bus bar sets can be mounted on the base module, it is a simple and flexible way of providing different switching cell types.

Figure 1:
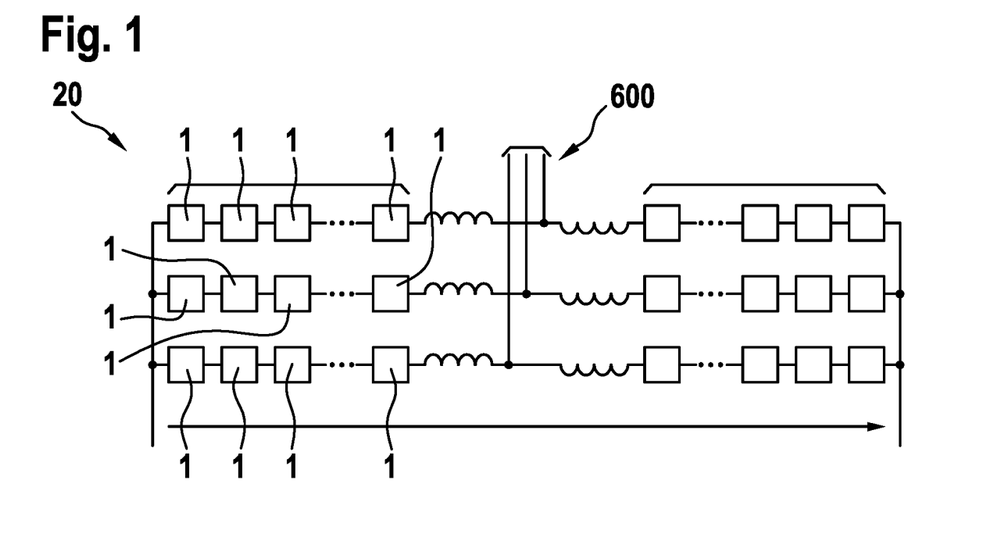
FIG. 1 is a schematic view of a high voltage direct current power converter according to an embodiment of the present invention.
Figure 2:
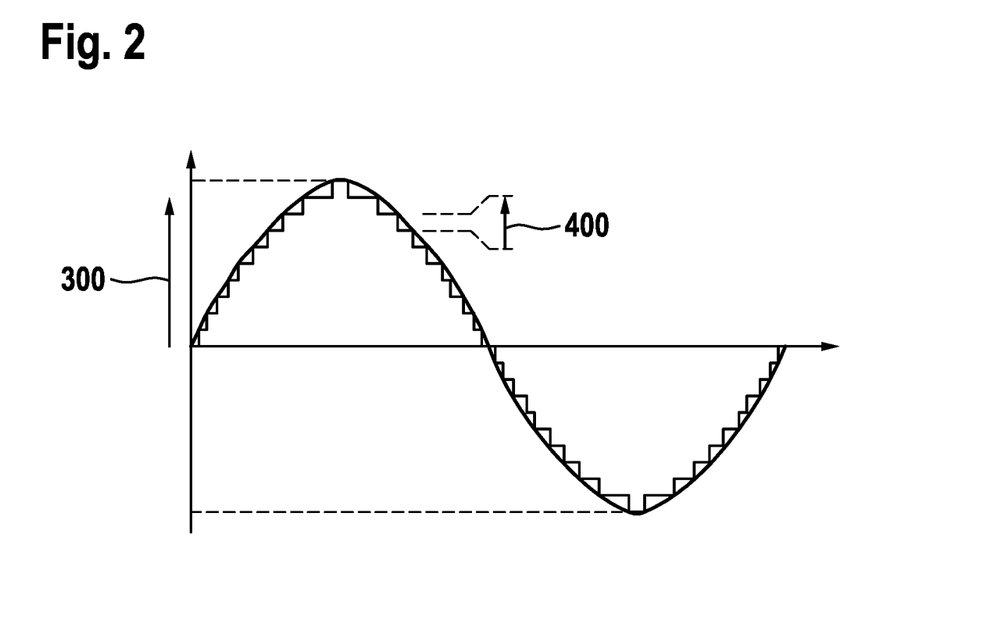
FIG. 2 is a schematic view of a phase output voltage of the high voltage direct current power converter according to an embodiment of the present invention.

FIG. 1 is a schematic view of a high voltage direct current converter 20, particularly for use in power transmission. The high voltage direct current power converter 20 includes a three phase voltage input 600 and is adapted to output direct voltage. For each phase of the three phase voltage input 600, a plurality of switching cells 1 are connected in series. A phase output voltage 300 can thus be divided into a plurality of cell voltages 400 of the single switching cells 1 as shown in FIG. 2. By respective switching of the switching cells 1, the phase output voltage 300 can be converted to direct voltage.

Figure 3:
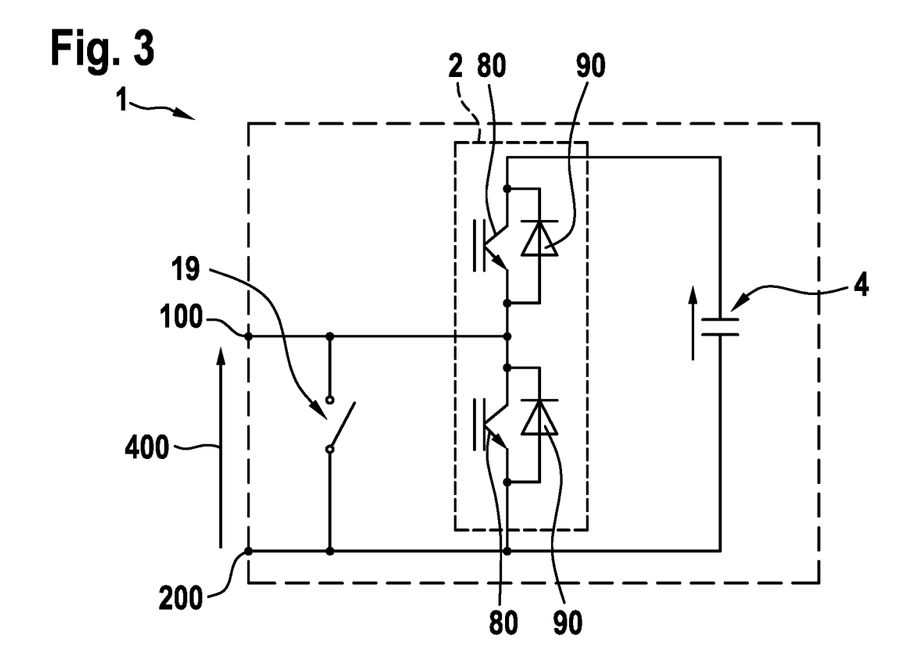
FIG. 3 is a schematic view of a half-bridge switching cell of the high voltage direct current power converter according to an embodiment of the present invention.
Figure 4:
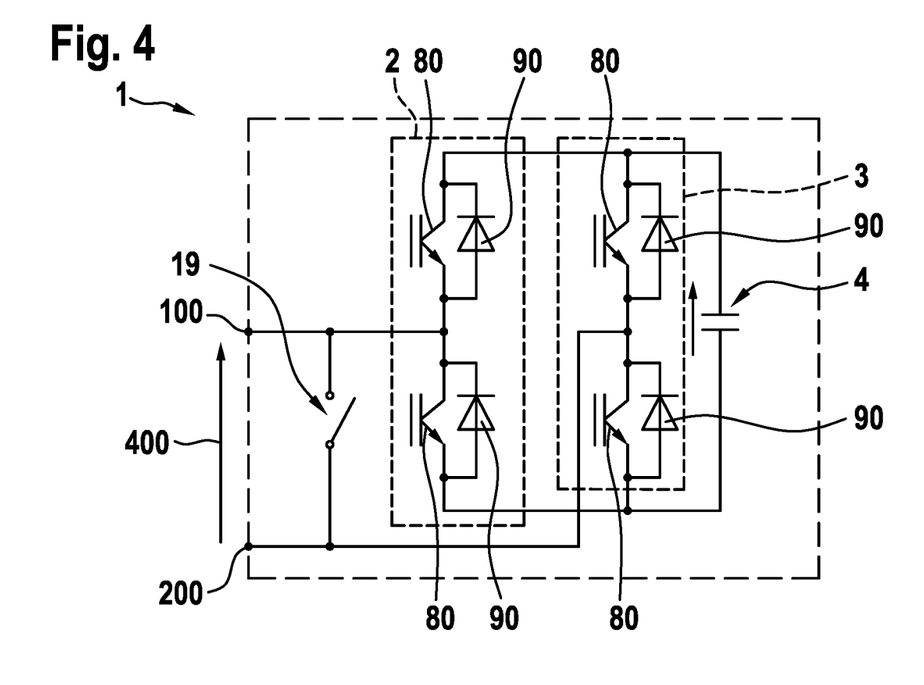
FIG. 4 is a schematic view of a full-bridge switching cell of the high voltage direct current power converter according to an embodiment of the present invention.

FIGS. 3 and 4 show different cell types of the switching cells 1. All switching cells 1 are provided between a first cell terminal 100 and a second cell terminal 200. In FIG. 3, a half bridge is shown, while FIG. 4 shows a full bridge. While the half bridge can block the current in one direction only, the full bridge can block the current in two directions. The half bridge design shown in FIG. 3 therefore is a switching cell 1 using only one single first switching unit 2. The switching cell 1 according to the full bridge design shown in FIG. 4 on the other side has a first switching unit 2 and a second switching unit 3. In this embodiment, the first switching unit 2 and the second switching unit 3 are half bridge elements. Therefore, the two half bridge elements of the first switching unit 2 and the second switching unit 3 are combined to form a full bridge in FIG. 4.

Each of the switching units 2, 3 therefore has two IGBTs 80 and two diodes 90. One IGBT 80 and one diode 90 are connected in parallel and the two sets of parallel IGBT 80 and diode 90 are connected in series. In this way, the above-described half bridge element is formed.

Each switching cell 1 further includes at least a first capacitor 4. The first capacitor 4 is provided in parallel to the switching units 2, 3. Thus, the switching cells 1 divide the phase output voltage 300 in several cell voltages 400, between the first cell terminal 100 and second cell terminal 200 of the respective switching cell 1, such that the switching cells 1 can be used to convert the phase output voltage 300 to direct voltage.

A bypass switch 19 may be provided to allow current to bypass the switching cell 1 in case of a cell failure and thus keep the converter 20 operating. This may be realized using a combination of thyristor, mechanical contactor or fast-acting pyrotechnic device. The bypass switch 19 may not be required if the semiconductor switch used in the cell fail to short, e.g. specially-designed press-pack IGBTs or integrated gate commutated thyristors (IGCTs).

Figure 5:
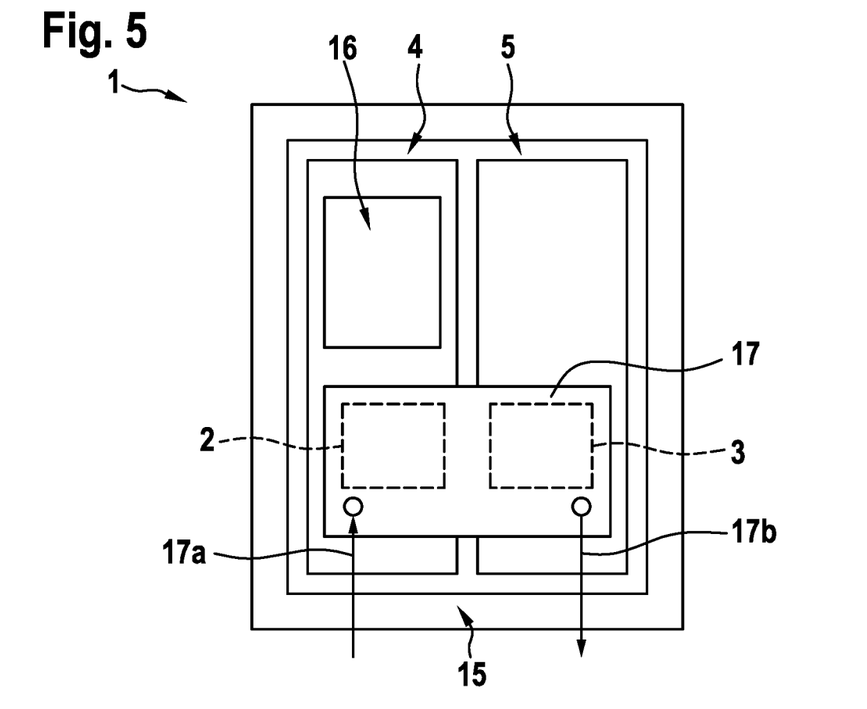
FIG. 5 is a schematic view of a switching cell according to an embodiment of the present invention.
Figure 6:
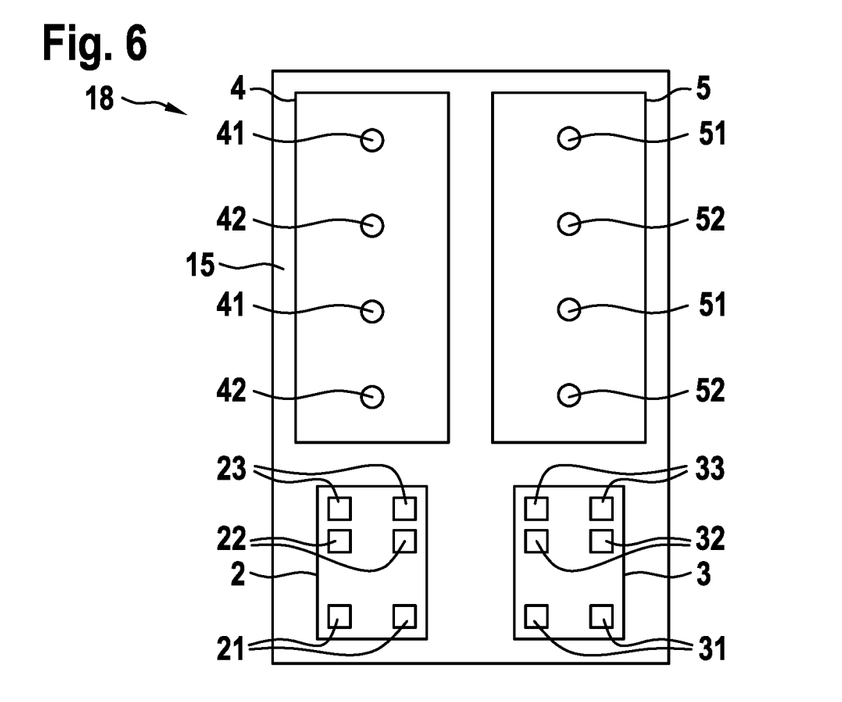
FIG. 6 is a schematic view of a base module of the switching cell according to an embodiment of the present invention.

FIG. 5 is a schematic view of the switching cell 1 according to an embodiment of the invention. The switching cell 1 includes a first switching unit 2 and a second switching unit 3 as shown in FIGS. 3 and 4 as well as a first capacitor 4 and a second capacitor 5. FIG. 5 shows the first switching unit 2, the second switching unit 3, the first capacitor 4 and the second capacitor 5 being mounted on a common chassis 15. The two switching units 2, 3 also share the same heat sink 17, such that the switching cell 1 only has a single inlet 17a and outlet 17b for cooling fluid. The switching cell 1 also has a common control unit 16, which particularly drives the IGBTs 80 of the switching units 2, 3. Therefore, the switching cell 1 has a higher energy density compared with two single cells only having one switching unit. In addition, since all the components are provided on the same chassis 15, the chassis 15 functions as common chassis ground.

The switching cell 1 does not have a fixed cell design. The switching cell 1 can rather be configured to have different cell designs such that a flexibility in providing a converter 20 with different demands is given. To allow different cell designs, the switching cell 1 has a base module 18, which includes the first switching unit 2, the second switching unit 3, the first capacitor 4 and the second capacitor 5. The base module 18 is also adapted to receive different busbar sets. Each busbar set connects the elements of the base module 18 in a different manner to realize different cell designs.

Preferably, the busbars of the busbar sets contact the elements of the base module 18 all from the same side. Therefore, mounting the busbar sets and electrically connecting the first switching unit 2, the second switching unit 3, the first capacitor 4 and the second capacitor 5 is simplified.

In order to be electrically contacted by the busbar sets, the first switching unit 2 has a first AC voltage terminal 21, a first negative DC terminal 22, and a first positive DC terminal 23. A first switch is provided between the first AC voltage terminal 21 and the first negative DC terminal 22, and a second switch between the first AC voltage terminal 21 and the first positive DC terminal 23, wherein the two switches consist of the above described parallel IGBT 80 and diode 90.

In the same way, the second switching unit 3 has a second AC voltage terminal 31, a second negative DC terminal 32, and second positive DC terminal 33. A third switch is provided between the second AC voltage terminal 31 and the second negative DC terminal 32, and a fourth switch between the second AC voltage terminal 31 and the second positive DC terminal 33. Again, the two switches, i.e. the third switch and the fourth switch, consists of the above described parallel IGBT 80 and diode 90.

The first capacitor 4 is provided between a first capacitor terminal 41 and a second capacitor terminal 42 and the second capacitor 5 is provided between a third capacitor terminal 51 and a fourth capacitor terminal 52. All the terminals described above are preferably on the same side of the switching cell 1 to ensure that the switching cell 1 can be electrically contacted via the busbar sets from a single side.

Starting from such a basic design, the switching cell 1 can be set to different cell designs. Particularly, the two switching units 3, 4 can be paralleled to increase the current rating or to form a full bridge. The switching units 3, 4 can also be put in series to form a dual switching cell consisting of two conventional switching cells. In the following, three different designs are shown which are all realized by different busbar sets with the same base module 18.

Figure 7:
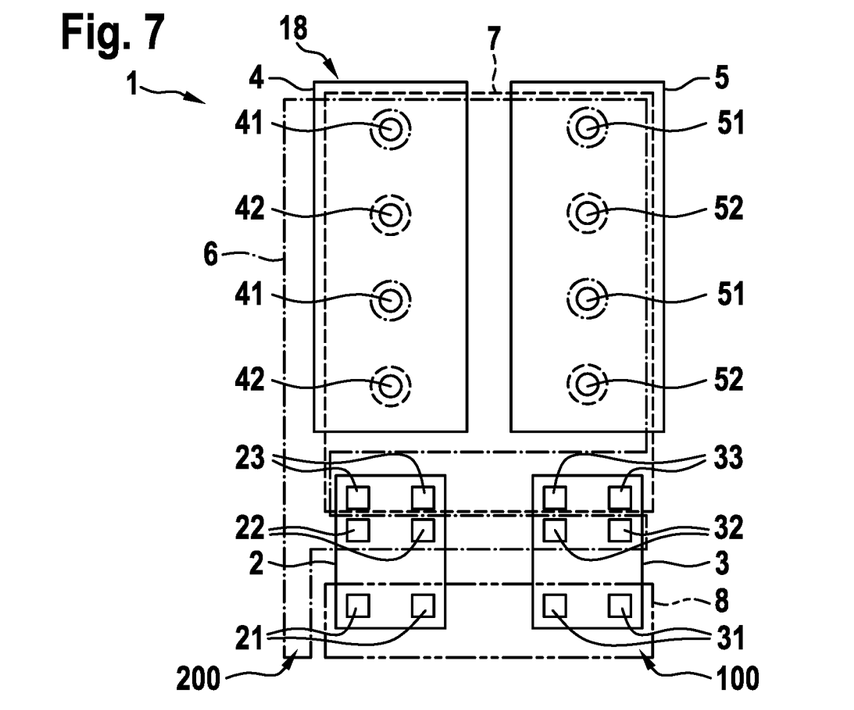
FIG. 7 is a schematic view of a first alternative of the switching cell according to the an embodiment of the present invention.
Figure 8:
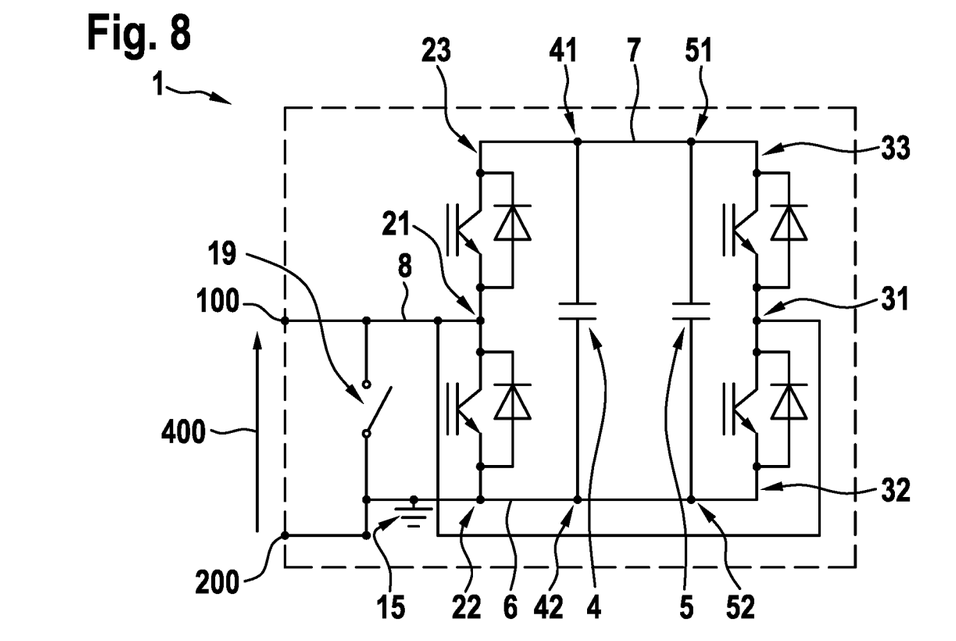
FIG. 8 is a schematic wire diagram of the first alternative of the switching cell according to an embodiment of the present invention.
Figure 9:
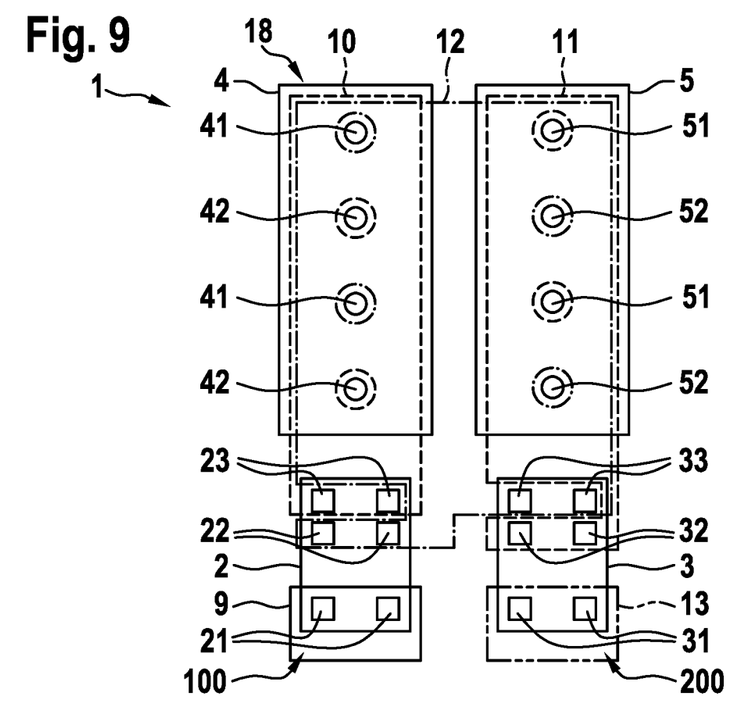
FIG. 9 is a schematic view of a second alternative of the switching cell according to an embodiment of the present invention.
Figure 10:
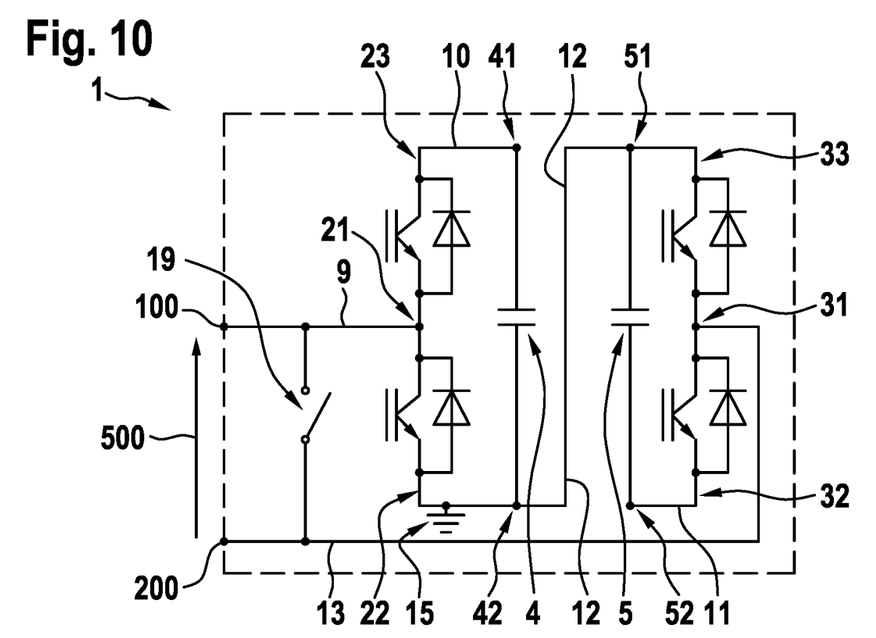
FIG. 10 is a schematic wire diagram of the second alternative of the switching cell according to an embodiment of the present invention.
Figure 11:
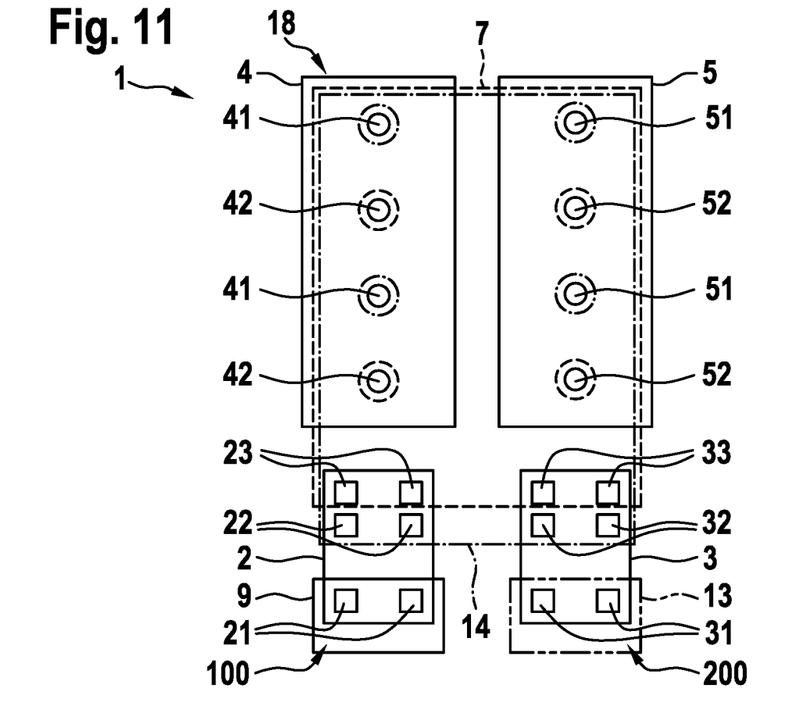
FIG. 11 is a schematic view of a third alternative of the switching cell according to an embodiment of the present invention.
Figure 12:
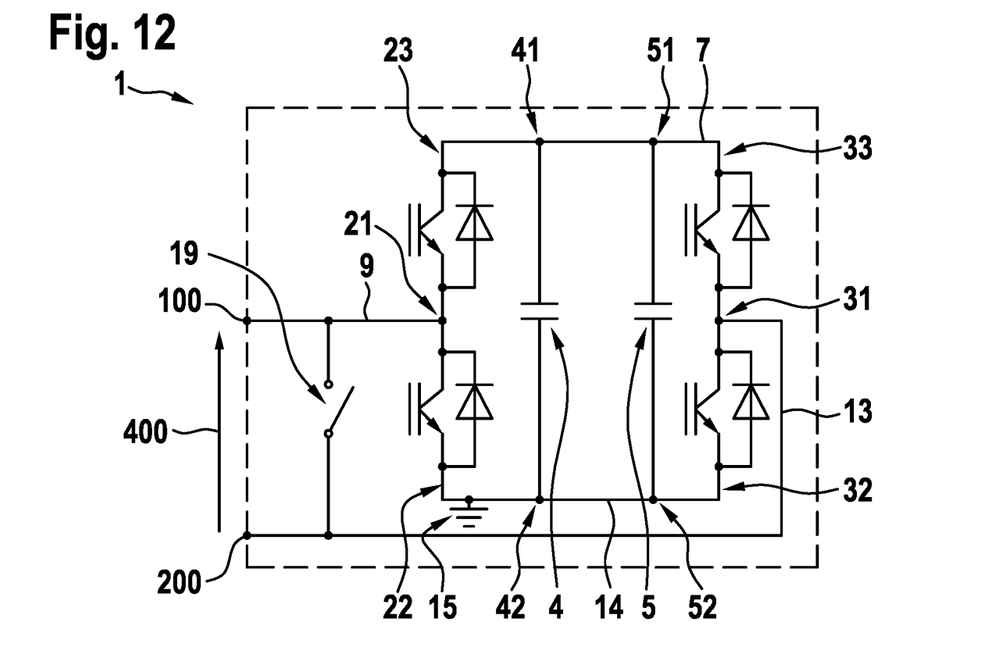
FIG. 12 is a schematic wire diagram of the third alternative of the switching cell according to an embodiment of the present invention.

In FIGS. 7 and 8, two parallel half bridge circuits between the first cell terminal 100 and the second cell terminal 200 are shown. FIG. 7 schematically shows the design of the switching cell 1, while FIG. 8 shows a schematic wire diagram. In FIGS. 9 and 10, two serial half bridge circuits between the first cell terminal 100 and the second cell terminal 200 is shown. FIG. 9 schematically shows the design of the switching cell 1, while FIG. 10 shows a schematic wire diagram. A full bridge circuit between the first cell terminal 100 and the second cell terminal 200 is finally shown in FIGS. 11 and 12. FIG. 11 schematically shows the design of the switching cell 1, while FIG. 12 shows a schematic wire diagram.

In the design according to FIGS. 7 and 8, a first busbar set including a first busbar 6, a second busbar 7, and a third busbar 8 is used to interconnect the first AC voltage terminal 21, the first negative DC terminal 22, the first positive DC terminal 23, the second AC voltage terminal 31, the second negative DC terminal 32, the second positive DC terminal 33, the first capacitor terminal 41, the second capacitor terminal 42, the third capacitor terminal 51, and the fourth capacitor terminal 52.

The first negative DC terminal 22 and the second negative DC terminal 32 and the second capacitor terminal 42 and the fourth capacitor terminal 52 are electrically connected via the first busbar 6. The first positive DC terminal 23 and the second positive DC terminal 33 and the first capacitor terminal 41 and the third capacitor terminal 51 are electrically connected via the second busbar 7. The third busbar 8 electrically connects the first AC voltage terminal 21 and the second AC voltage terminal 31. In this design, the first busbar 6 is the second cell terminal 200 and the third busbar 8 is the first cell terminal 100.

As particularly shown in FIG. 8, the first switching unit 2, the second switching unit 3 as well as the first capacitor 4 and the second capacitor 5 are connected in parallel to each other. Therefore, the switching cell 1 is a fully-rated half bridge since the parallel connection of components doubles the current the switching cell can carry. A common chassis ground is provided via the chassis 15 at the first negative DC terminal 22 and the second negative terminal 23, which are identical in this design.

The same base module 18 can be provided with a different second busbar set shown in FIGS. 9 and 10 to form a half-rated dual cell. The second busbar set includes a fourth busbar 9, a fifth busbar 10, a sixth busbar 11, a seventh busbar 12, and an eighth busbar 13, which interconnect the first AC voltage terminal 21, the first negative DC terminal 22, the first positive DC terminal 23, the second AC voltage terminal 31, the second negative DC terminal 32, the second positive DC terminal 33, the first capacitor terminal 41, the second capacitor terminal 42, the third capacitor terminal 51, and the fourth capacitor terminal 52.

The first AC voltage terminal 21 is electrically connected to the fourth busbar 9. The first positive DC terminal 23 and the first capacitor terminal 41 are electrically connected via the fifth busbar 10. The second negative DC terminal 32 and the fourth capacitor terminal 52 are electrically connected via the sixth busbar 11. The seventh busbar 12 electrically connects the first negative DC terminal 22 and the second positive DC terminal 33 and the second capacitor terminal 42 and the third capacitor terminal 51. Finally, the second AC voltage terminal 31 is electrically connected to the eighth busbar 13. In this cell design, the fourth busbar 9 is the first cell terminal 100 and the eighth busbar 13 is the second cell terminal 200. Thus, the first switching unit 2 and the first capacitor 4 form a half-rated half bridge which is connected in series to another half-rated half bridge formed from the second switching unit 3 and the second capacitor 5. Particularly, the two half-rated half bridges are formed as mirror of each other such that they can share the same power supply and controller. A common chassis ground is provided by chassis 15 at the first negative DC terminal 22 and the second positive DC terminal which are identical in this design.

In the design of FIGS. 9 and 10, the cell outputs the double cell voltage 500, which is twice the cell voltage 400. Thus, with the same components, either a fully-rated half bridge or two half-rated half bridges can be provided. Hence, based on the respective needs of the converter 20, the same base module 18 can be provided as different cell topologies.

Further, in the design of FIGS. 9 and 10, two options apply to the bypass switch 19. Either one bypass switch may be used for each of the two half bridges, with the two bypass switches connected in series and the mid-point between them also connected to the mid-point between the two half bridges, or one bypass switch may be used for the whole switching cell 1. In case two bypass switches are used, each one needs the same voltage rating as for the single switching cell 1, while using a single bypass switch for the whole switching cell 1 requires a higher voltage rating since the bypass switch 19 has to carry the double cell voltage 500 which is twice the cell voltage 400.

FIGS. 11 and 12 finally show a half-rated full bridge design. In this design, the two switching units 2, 3, which are formed as half bridge modules, are combined to set up a full bridge. To realize such a design, a third busbar set including the above-described second busbar 7, the above-described fourth busbar 9, the above-described eighth busbar 13, and an additional ninth busbar 14. The ninth busbar 14 electrically connects the first negative DC terminal 22 and the second negative DC terminal 32 and the second capacitor terminal 42 and the fourth capacitor terminal 52. The chassis 15 provides a common chassis ground at the first negative DC terminal 22 and the second negative DC terminal 32.

The busbars of each busbar set advantageously are laminated busbars. This particularly helps to reduce the stray inductance between the IGBTs 80 and the capacitors 4, 5 to ensure optimal switching of the switching cells 1.

Hence, in addition to the fully-rated half bridge and the dual half-rated half bridges, the base module 18 can be provided with another busbar set to form a half-rated full bridge. Thus there is a wide variety of different cell options which can be provided from one single base module 18.

Figure 13:
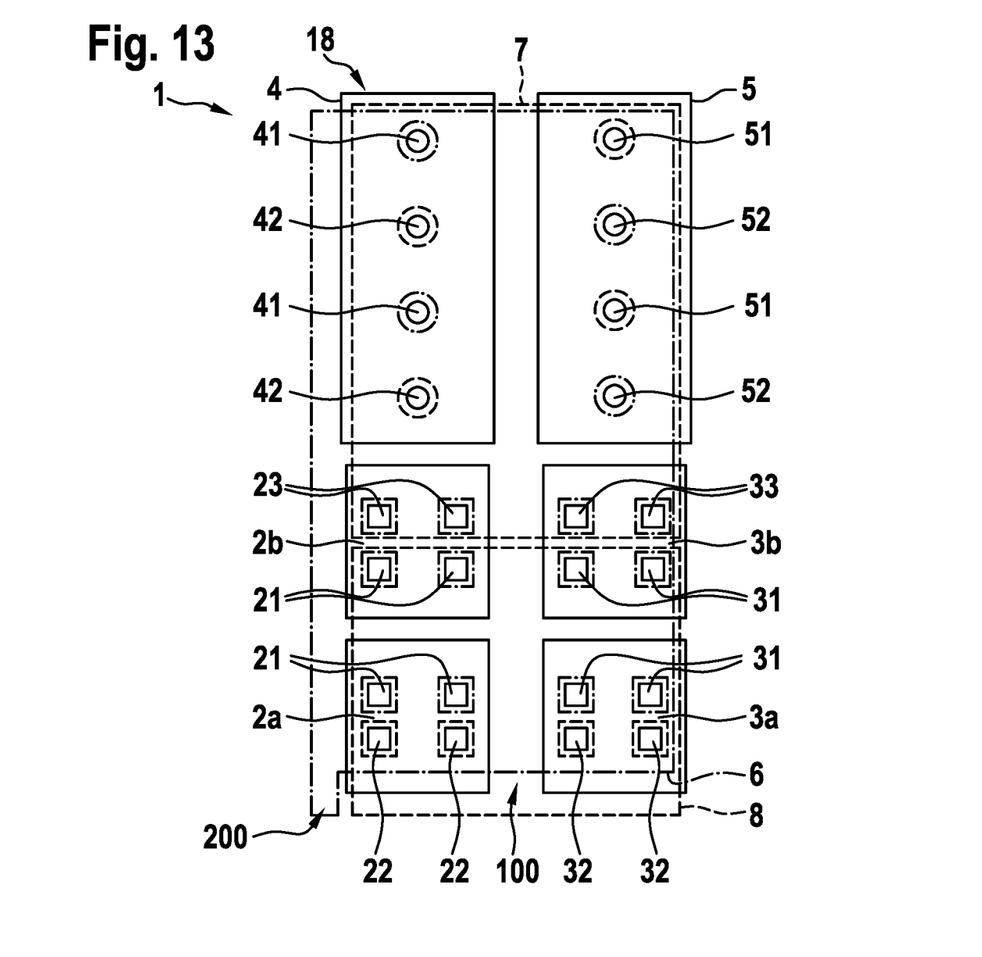
FIG. 13 is a schematic view of a switching cell according to an embodiment of the invention.

FIG. 13 shows the same cell design of the switching cell 1 as shown in FIG. 7, wherein a different first switching unit 2 and second switching unit 3 are used. In the above described embodiments, the first switching unit 2 and the second switching unit 3 are described as half bridge modules. As shown in FIG. 13, another setup using single switch modules can also be adopted.

Thus, the first switching unit 2 includes a first sub-switching unit 2a and a second sub-switching unit 2b. The first sub-switching unit 2a has the first AC voltage terminal 21, the first negative DC terminal 22, and the first switch provided between the first AC voltage terminal 21 and the first negative DC terminal 22. The second sub-switching unit 2b also has the first AC voltage terminal 21 and further includes the first positive DC terminal 23, and the second switch provided between the first AC voltage terminal 21 and the first positive DC terminal 23. In an analogous manner, the second switching unit 3 includes a third sub-switching unit 3a and a fourth sub-switching unit 3b. The third sub-switching unit 3a has the second AC voltage terminal 31, the second negative DC terminal 32, and the third switch, which is provided between the second AC voltage terminal 31 and the second negative DC terminal 31. The fourth sub-switching unit 3b has the second AC voltage terminal 31, the second positive DC terminal 33, and the fourth switch, which is provided between the second AC voltage terminal 31 and the second positive DC terminal 33. Thus the sub-switching units 2a, 2b, 3a, 3b have to be contacted separately via the first busbar 6, the second busbar 7, and the third busbar 8, wherein the cell design remains the same as shown in FIG. 7. The setup of the switching units 2, 3, i.e. the usage of the sub-switching units 2a, 2b, 3a, 3b can be applied to any other cell design, particularly to the designs shown in FIGS. 9 and 11.

Figure 14:
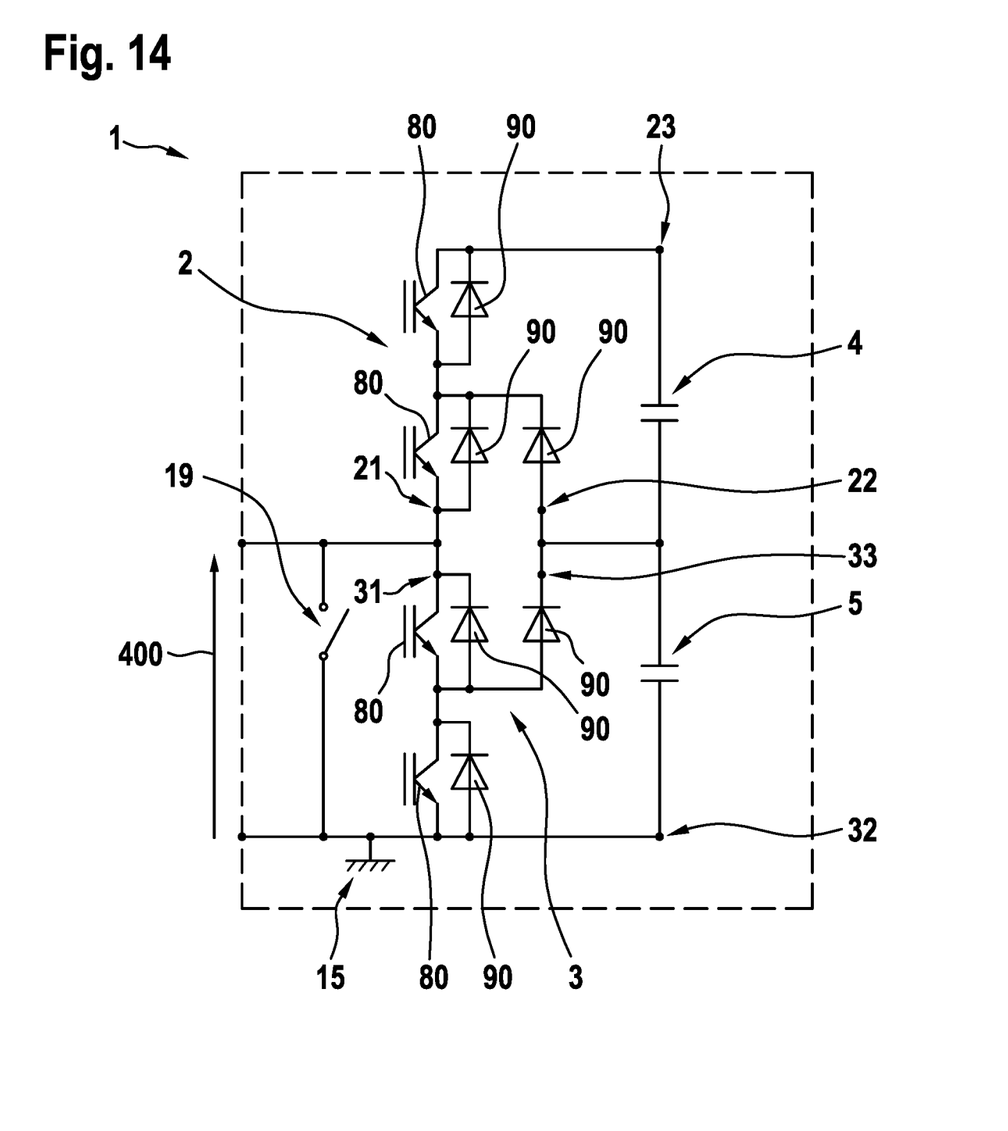
FIG. 14 is a schematic wire diagram of a switching cell according to an embodiment of the invention.

FIG. 14 finally shows a further design option of the switching units 2, 3. In this design option, the switching units 2, 3 are provided as multi-level bridge legs with three levels. To realize such a design, an additional diode 90 is included in each switching unit 2, 3.

The switching cell 1 as described above can be used for different purposes, while all switching cells 1 share the same base components. Thus, always the same hardware can be adopted for providing a variety of different switching cells 1 for a convertor 20. The switching cells 1 are of lower costs since only one set of control components, e.g. the control unit 16 and the heat sink 17, has to be provided. The switching cells 1 are such that a maximum component re-use and design re-use is possible. Further, particularly in the case of the dual cell including two half-rated half bridges, a compact cell design is provided. Since the component count and the number of coolant and electrical connections are reduced, the reliability is increased.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS 1 switching cell
2 first switching unit
21 first AC voltage terminal
22 first negative DC terminal
23 first positive DC terminal
3 second switching unit
31 second AC voltage terminal
32 second negative DC terminal
33 second positive DC terminal
4 first capacitor
41 first capacitor terminal
42 second capacitor terminal
5 second capacitor
51 third capacitor terminal
52 fourth capacitor terminal
6 first busbar
7 second busbar
8 third busbar
9 fourth busbar
10 fifth busbar
11 sixth busbar
12 seventh busbar
13 eighth busbar
14 ninth busbar
15 chassis
16 control unit
17 heat sink
17a inlet
17b outlet
18 base module
19 bypass switch
20 converter unit
80 IGBT
90 Diode
100 first cell terminal
200 second cell terminal
300 phase output voltage
400 cell voltage
500 double cell voltage
600 three-phase voltage input

The invention claimed is:

1. A modular switching cell of a high voltage direct current power converter, the modular switching cell comprising a base module that comprises:
   a first switching unit;
   a second switching unit;
   a first capacitor; and
   a second capacitor,
   wherein the first switching unit, the second switching unit, the first capacitor, and the second capacitor are mounted on a chassis, and wherein the base module is configured to receive at least three different busbar sets, each of the busbar sets comprising a plurality of busbars for interconnecting the first switching unit, the second switching unit, the first capacitor, and the second capacitor to form one of:

two parallel half bridge circuits between a first cell terminal and a second cell terminal; and two serial half bridge circuits between the first cell terminal and the second cell terminal; or a full bridge circuit between the first cell terminal and the second cell terminal.

2. The modular switching cell according to claim 1, wherein:

the first switching unit comprises a first AC voltage terminal, a first negative DC terminal, a first positive DC terminal, a first switch between the first AC voltage terminal and the first negative DC terminal, and a second switch between the first AC voltage terminal and the first positive DC terminal, the second switching unit comprises a second AC voltage terminal, a second negative DC terminal, a second positive DC terminal, a third switch between the second AC voltage terminal and the second negative DC terminal, and a fourth switch between the second AC voltage terminal and the second positive DC terminal, and the base module is configured to receive each busbar set, of the busbar sets such that the busbars of the respective busbar set interconnect the first AC voltage terminal, the first negative DC terminal, the first positive DC terminal, the second AC voltage terminal, the second negative DC terminal, the second positive DC terminal, the first capacitor, and the second capacitor to form one of: the two parallel half bridge circuits, the two serial half bridge circuits, or the full bridge circuit.

3. The modular switching cell according to claim 2, wherein at least the first negative DC terminal is electrically connected to the chassis, wherein the chassis is configured as a chassis ground.

4. The modular switching cell according to claim 2, wherein the first switch and the second switch of the first switching unit, and the third switch and the fourth switch of the second switching unit all include an electronic switch and a diode that are wired in parallel to each other.

5. The modular switching cell according to claim 2, comprising a single control unit configured to switch the first switch and the second switch of the first switching unit, and the third switch and the fourth switch of the second switching unit.

6. The modular switching cell according to claim 2, wherein: the first switching unit comprises a first sub-switching unit and a second sub-switching unit, wherein: the first sub-switching unit comprises the first AC voltage terminal, the first negative DC terminal, and the first switch; and the second sub-switching unit comprises the first AC voltage terminal, the first positive DC terminal, and the second switch, and the second switching unit comprises a third sub-switching unit and a fourth sub-switching unit, wherein: the third sub-switching unit comprises the second AC voltage terminal, the second negative DC terminal, and the third switch; and the fourth sub-switching unit comprises the second AC voltage terminal, the second positive DC terminal, and the fourth switch.

7. The modular switching cell according to claim 1 wherein the first switching unit, the second switching unit, the first capacitor, and the second capacitor are provided with a common heat sink.

8. The modular switching cell according to claim 1 comprising a bypass switch provided between the first cell terminal and the second cell terminal, wherein the bypass switch is configured to bypass the switching cell.

9. The modular switching cell according to claim 1 wherein the first switching unit, the second switching unit, the first capacitor, and the second capacitor, are electrically connectable via the busbar sets all from a same side.

10. A system comprising the modular switching cell according to claim 2 and at least two of: a first busbar set, a second busbar set, or a third busbar set, wherein the first capacitor is provided between a first capacitor terminal and a second capacitor terminals, and the second capacitor is provided between a third capacitor terminal and a fourth capacitor terminal, wherein:

the first busbar set comprises a first busbar, a second busbar, and a third busbar, wherein:

the first negative DC terminal, the second negative DC terminal, the second capacitor terminal, and the fourth capacitor terminal are electrically connected via the first busbar;

the first positive DC terminal, the second positive DC terminal, the first capacitor terminal, and the third capacitor terminal are electrically connected via the second busbar;

the first AC voltage terminal and the second AC voltage terminal are electrically connected via the third busbar; and the first busbar is the second cell terminal and the third busbar is the first cell terminal, and/or:

the second busbar set includes a fourth busbar, a fifth busbar, a sixth busbar, a seventh busbar, and an eighth busbar, wherein:

the first AC voltage terminal is electrically connected to the fourth busbar;

the first positive DC terminal and the first capacitor terminal are electrically connected via the fifth busbar;

the second negative DC terminal and the fourth capacitor terminal are electrically connected via the sixth busbar;

the first negative DC terminal and the second positive DC terminal and the second capacitor terminal and the third capacitor terminal are electrically connected via the seventh busbar;

the second AC voltage terminal is electrically connected to the eighth busbar; and the fourth busbar is the first cell terminal and the eighth busbar is the second cell terminal, and/or:

the third busbar set comprises the second busbar, the fourth busbar, the eighth busbar, and a ninth busbar wherein:

the first negative DC terminal and the second negative DC terminal and the second capacitor terminal and the fourth capacitor terminal are electrically connected via the ninth busbar.

11. The system according to claim 10 wherein the busbars of each busbar set, of the busbar sets, are laminated busbars.

12. The system according to claim 10 wherein each busbar set, of the busbar sets, comprises busbars that define the first cell terminal and the second cell terminal configured to electrically connect the switching cell with other components, comprising other switching cells, of the power converter.

13. A high voltage direct current power converter comprising a three phase voltage input and, for each phase of the three phase voltage input, a plurality of switching cells according to claim 1, wherein the switching cells are connected in series.

14. A method of manufacturing a modular switching cell, the method comprising:
providing a base module by mounting a first switching unit, a second switching unit, a first capacitor, and a second capacitor on a chassis,
providing at least two different busbar sets, each of the busbar sets comprising a plurality of busbars for interconnecting the first switching unit, the second switching unit, the first capacitor, and the second capacitor, wherein the busbars of each busbar set, of the busbar sets, is configured to form one of:
two parallel half bridge circuits between a first cell terminal and a second cell terminal;
two serial half bridge circuits between the first cell terminal and the second cell terminal; or
a full bridge circuit between the first cell terminal and the second cell terminal, and
mounting one of the busbar sets on the base element.

* * * * *